United States Patent [19]  [11]  3,888,834
Yamaguchi et al.  [45] June 10, 1975

[54] PROCESS FOR PREPARING IMPROVED ETHYLENE COPOLYMER

[75] Inventors: Kazuo Yamaguchi, Tokyo; Natsuki Kanoh, Sagamihara; Isao Ito, Tokyo; Nobuo Enokido, Kawasaki, all of Japan

[73] Assignee: Mitsubishi Chemical Industries Ltd., Tokyo, Japan

[22] Filed: Apr. 25, 1973

[21] Appl. No.: 354,362

[30] Foreign Application Priority Data
Apr. 25, 1972 Japan.............................. 47-41533

[52] U.S. Cl................................ 260/80.7; 260/85.3
[51] Int. Cl. ...... C08f 1/42; C08f 15/04; C08f 15/40
[58] Field of Search....................... 260/85.3 R, 80.7

[56]  References Cited
UNITED STATES PATENTS
3,766,158  10/1973  Yamaguchi et al............ 260/85.3 R Primary Examiner—Joseph L. Schofer
Assistant Examiner—A. Holler
Attorney, Agent, or Firm—Oblon, Fisher, Spivak, McClelland & Mier

[57]  ABSTRACT

A process is described for preparing improved ethylene copolymers which comprises copolymerizing ethylene and a diolefin or ethylene, an α-olefin and a diolefin in the presence of a catalyst system comprising a first solid component prepared by reducing a mixture or a reaction product of (a) a titanium halide and (b) a vanadyl trialcoholate with an alkylaluminum dihalide; and a second component of an organoaluminum compound.

6 Claims, No Drawings

PROCESS FOR PREPARING IMPROVED ETHYLENE COPOLYMER

BACKGROUND OF THE INVENTION

1. Field of the Invention:

This invention relates to a process for preparing an improved ethylene copolymer. More particularly, it relates to a process for preparing an improved ethylene copolymer by copolymerizing ethylene and a diolefin or ethylene, another $\alpha$-olefin and a diolefin.

2. Description of the Prior Art

Ethylene copolymers prepared by copolymerizing ethylene and a diolefin such as butadiene have the advantage of being able to form cross-linkable resins by an abrasion vulcanization process. The cross-linked resins produced have excellent abrasion resistance, chemical resistance, humidity resistance and mechanical strength.

It has been known that ethylene copolymers can be prepared by copolymerizing ethylene and butadiene in the presence of various Ziegler catalysts, however, it has been difficult to achieve high polymerization activity and high copolymerization reactivity with these catalysts. In the copolymerization reaction, the relative reactivity of the monomer pair is one of the important characteristics of the reaction as well as the polymerization activity. The relative reactivity of the monomer pair is particularly important in the copolymerization of ethylene and a diolefin. In addition, the diolefin has a relatively low copolymerization reactivity with ethylene in comparison to other $\alpha$-olefins such as propylene and butene-1. It is often necessary to polymerize ethylene in the presence of a high concentration of diolefin in order to obtain a copolymer containing a predetermined content of a diolefin component.

Another problem associated with the conventional processes for the copolymerization of ethylene and a diolefin has been that the average molecular weight of the products obtained has been too low because of the tendency of chain transfer reactions to occur. The average molecular weight of the product has been controlled by conducting the copolymerization reaction in the presence of hydrogen to stop the chain transfer reactions.

A need, therefore, exists for a polymerization catalyst which yields a product having a sufficient molecular weight and which improves the relative reactivity of diolefins with ethylene. It has been found that a specific titanium-vanadium catalyst has excellent copolymerization activity in the copolymerization of ethylene and a diolefin. It has also been found that the average molecular weight of the resulting copolymer can be controlled by carefully selecting the amount of hydrogen supplied to the polymerization medium containing the catalyst of this invention.

SUMMARY OF THE INVENTION

Accordingly, one object of this invention is to provide a process for preparing a copolymer of ethylene and a diolefin or ethylene, an $\alpha$-olefin and a diolefin which is effective for industrial purposes.

Briefly, these objects and other objects of this invention as hereinafter will become readily apparent can be attained by copolymerizing ethylene and a diolefin or ethylene, an $\alpha$-olefin and a diolefin in the presence of a catalyst system comprising a first solid component prepared by reducing a mixture or a reaction product of (a) a titanium halide and (b) a vanadyl trialcoholate with an alkylaluminum dihalide; and a second component of an organoaluminum compound.

DETAILED DESCRIPTION OF THE PREFERRED EMBODIMENTS

The titanium halides used in the preparation of the first solid component of the catalyst system include titanium tetrahalides such as titanium tetrachloride, titanium tetrabromide, and titanium tetraiodide. The vanadyl alcoholates used in the preparation of the first solid component include compounds having the formula $$VO(OR)_3$$

wherein R represents an alkyl group of 1 – 14 carbon atoms, especially methyl, ethyl, propyl, isopropyl, butyl or isobutyl. Suitable vanadyl trialcoholates include vanadyl triethylate, vanadyl triisopropylate, vanadyl tributylate, and the like.

In the preparation of the first solid component of the catalyst the titanium halide and the vanadyl alcoholate can be mixed without the presence of a solvent. However, mixing of the materials is usually conducted in an insert solvent, if desirable, at relatively high temperatures. Suitable inert solvents used in the preparation include aliphatic hydrocarbons such as pentane, hexane, heptane, octane, isooctane and the like; cyclic hydrocarbons such as cyclohexane, cyclopentane, decalin, and the like; aromatic hydrocarbons such as benzene, toluene, xylene, and the like; and pure kerosine, and the like. The amounts of the vanadyl alcoholate used are selected to give a V/Ti atomic ratio of preferably 0.01–100, especially 0.5 – 1.5. It is also possible to heat the mixture of the titanium halide and the vanadyl alcoholate.

When the titanium halide is mixed with the vanadyl alcoholate in the indicated manner, sometimes a ligand exchange reaction occurs between the two compounds. The resulting reaction product can be used directly in the reducing treatment which follows the admixture of the two compounds. The compounds of the first solid component used in the preparation of the catalyst of this invention, can be reduced with an organoaluminum compound. Suitable organoaluminum compounds include alkylaluminum dihalides such as ethylaluminum dichloride, butylaluminum dichloride, and the like. When one of these alkylaluminum dichlorides is used, a catalyst having excellent copolymerization reactivity can be obtained. The organoaluminum compound can be used without any further modification, or it can be used as a solution by dissolving it in one of the above-mentioned inert solvents. The reduction reaction can be usually performed at 50°C – 100°C. If the temperature of the reduction reaction is lower than 50°C, the catalytic activity of the resulting catalyst is disadvantageously low. The amount of the organoaluminum compound required for the reduction reaction is not critical, and it can be used in quantities greater than necessary to achieve an equimolar ratio of the organoaluminum compound to the total titanium halide and vanadyl alcoholate content.

The products prepared by the reduction reaction are usually hydrocarbon insoluble, solid components, and the solid component can be separated from the soluble fraction by filtration decantation, centrifugal separation and the like after reduction. It is preferable to remove most of any unreacted material and solvent remaining from the solid component after the separation procedure. The solid component is usually obtained as a slurry in the inert solvent.

The organoaluminum component which is used as the second component in combination with the first solid component can be any compound having the formula $$AlR_nX_{3-n}$$

wherein R represents a hydrocarbon group of 1 – 14 carbon atoms such as alkyl, aralkyl, aryl, alicyclic, and the like; X represents a halogen atom and $n$ represents an integer from 1 – 3. Suitable organoaluminum compounds include trialkyl aluminum compounds such as trimethylaluminum, triethylaluminum, triisobutylaluminum, trioctylaluminum; dialkylaluminum monohalides such as dimethylaluminum chloride, diethylaluminum chloride; alkylaluminum sesquihalides such as ethylaluminum sesquichloride; and alkylaluminum dihalides such as methylaluminum dichloride, ethylaluminum dichloride. Trialkylaluminum compounds are the preferable reducing agents.

The copolymerization reaction can be conducted by contacting a mixture of ethylene and a diolefin or a mixture of ethylene, another α-olefin and a diolefin with the catalyst system which is a combination of the first solid component and the fresh organoaluminum compound in the presence or in the absence of an inert solvent, in accordance with known procedures for the copolymerization of ethylene or other α-olefins.

The amounts of the first solid component and the organoaluminum compound selected are chosen so that the aluminum to transition metal atomic ratio is in the range of 1 – 50, preferably 1 – 5. Suitable diolefins for the copolymerization reaction preferably include 1,3-butadiene or alkyl substituted 1,3-butadienes such as 2-methyl-1,3-butadiene, 1-ethyl-1,3-butadiene and the like. Suitable α-olefins include propylene, butene-1, and the like.

It is possible to use any one of the suitable inert solvents listed as a solvent for the polymerization reaction. The polymerization is preferably conducted at a temperature from room temperature to 150°C under a pressure ranging from atmospheric pressure to 100 atms.

The average molecular weight of the resulting copolymer can be controlled by the presence of an appropriate amount of hydrogen in the polymerization reaction zone. It is especially preferable to perform the polymerization reaction in the presence of an inert solvent as a slurry, wherein the resulting copolymer is insoluble in the inert solvent, because the copolymer can be obtained as particles having a high bulk density greater than 0.3 g/cm³. In the slurry polymerization, the temperature of the copolymerization reaction is usually in the range of 70° – 90°C.

If an α-olefin is added to the polymerization mixture it is preferable that the resulting copolymer have less than 10 mole % α-olefin units to ethylene units. When ethylene and a diolefin or ethylene, an α-olefin and a diolefin are copolymerized in the presence of the catalyst system of this invention, the copolymerization reactivity attained is high.

In the polymerization reaction system (or the liquid phase of a slurry polymerization reaction system), the molar ratio of diolefin to ethylene is selected to fall within the range of 0.1 – 3.0 so that a copolymer containing diolefin units of 0.1 – 4.0 mole % in comparison to ethylene units can be easily obtained.

In accordance with the process of this invention, decreases in the molecular weight of the product caused by the addition of a diolefin such as butadiene do not occur. Accordingly, the average molecular weight of the copolymer can be easily controlled by carefully selecting the amount of hydrogen supplied. The partial pressure of hydrogen in the polymerization reactor varies depending upon the average molecular weight of the product desired. It is usually less than 3 times the partial pressure of ethylene. The diolefin content of the copolymer can be sufficiently controlled by carefully selecting the amount of diolefin supplied.

The catalyst system used for the polymerization process of this invention, has a remarkably high polymerization activity which produces more than 100,000 g of the copolymer per 1 g of the catalyst system. It is possible in this process to eliminate the step of removing residual catalyst from the resulting copolymer thus affording simpler industrial operating procedures.

In the copolymer prepared in accordance with this invention, most of the double bonds present in the copolymer, which result from the diolefin units incorporated in the copolymer, are contained in the main polyethylene chain and most of the double bonds have a trans 1,4 structure. As shown in the examples below, more than 96% of the total double bonds are of the trans 1,4 structure. Accordingly, the density of the copolymer is usually high and copolymers having a density greater than 0.940 can easily be obtained. By the process of this invention it is possible to prepare an improved polyethylene polymer having a high density greater than 0.940, a high average molecular weight from 50,000 to 150,000 molecular weight units and a double bond content (derived from the diolefin units present) of 0.1 to 4 mole % (based on the ethylene unit content).

The improved polyethylene polymer of this invention has a remarkably high industrial utility. For example, when the improved polyethylene polymer is modified by graft copolymerization, the graft efficiency is substantially high. Moreover, the improved polyethylene polymer has a remarkably high affinity to inorganic materials.

Having generally described the invention, a further understanding can be obtained by reference to certain specific examples which are provided herein for purposes of illustration only and are not intended to be limiting in any manner unless otherwise specified.

EXAMPLE 1

Into a 300 ml vessel, 100 ml of dehydrated and deoxygenated cyclohexane, 20 mmole of titanium tetrachloride and 20 mmole of vanadyl tri-n-butylate were charged under a nitrogen gas atmosphere, and the mixture was stirred at 60°C for 1 hour. An 80 mmole amount of ethylaluminum dichloride was added dropwise to the mixture for 30 minutes, whereby a cyclohexane insoluble precipitate immediately formed. After the addition of the components, the mixture was stirred at 60°C for 2 hours and the resulting solid was filtered, and was washed with dehydrated and deoxygenated normal hexane to remove the soluble components.

Into a 1l autoclave, 500 ml of pure, normal hexane, 10 mg of said solid product and 0.15 mmole of tri-isobutylaluminum were charged, and the mixture was heated to 90°C. A gas mixture of ethylene and butadiene was supplied to the reactor in a molar ratio of butadiene/ethylene of 0.07 as a vapor, whereby the copolymerization reaction was initiated. Ethylene gas was then admitted to the reactor to maintain a constant pressure of 10 kg/cm$^2$ in the reactor. The molar ratio of ethylene to butadiene was 0.64 and 0.07 respectively in the liquid phase and in the vapor phase. As a result, 140 g of a copolymer powder containing 4.5 double bonds per 1,000 carbon atoms was obtained. 97% of the double bonds were in the inner trans form.

REFERENCES 1 – 2

The procedure of Example 1 was followed except that ethylaluminum sesquichloride or diethylaluminum chloride were used instead of ethylaluminum dichloride as the reducing agent in the preparation of the catalyst component. The results of the processes of Example 1 and References 1 and 2 are shown in Table I.

TABLE I

|  | Reducing agent | Yield(g) | double bond number per 1,000 carbon atoms |
|---|---|---|---|
| Example 1 | AlC$_2$H$_5$Cl$_2$ | 140 | 4.5 |
| Reference 1 | Al(C$_2$H$_5$)$_{1.5}$Cl$_{1.5}$ | 155 | 1.5 |
| Reference 2 | Al(C$_2$H$_5$)$_2$Cl | 64 | 1.6 |

It is clear from the data that the catalyst prepared by using ethylaluminum dichloride as a reducing agent, has a remarkably high copolymerization reactivity.

EXAMPLES 2 – 4

The procedure of Example 1 was followed except that the temperature of the reduction reaction in the preparation of the catalyst component was modified and the polymerization conditions used are shown in Table II.

The results are shown in Table III.

TABLE II

|  | Temperature of reduction (°C) | Polymerization Conditions | | |
|---|---|---|---|---|
|  |  | ethylene pressure (kg/cm$^2$) | hydrogen pressure (kg/cm$^2$) | molar ratio of ethylene/butadiene (liquid) |
| Example 2 | 50 | 10 | — | 0.38 |
| Example 3* | 80 | 10 | 6 | 0.41 |
| Example 4** | 100 | 10 | — | 0.41 |

*Hydrogen was admitted at the pressure shown in Table II into the autoclave during polymerization.
**Isooctane was used as the medium for the reduction instead of cyclohexane.

TABLE III

|  | Yield copolymer (g) | Catalytic activity *** | Double bond number/1000 C | | Molecular weight | | Density (g/cc) | Young modul (× 10$^{-3}$ kg/cm$^2$) |
|---|---|---|---|---|---|---|---|---|
|  |  |  | total F number | trans 1.4F(%) | M.I | Mv×10$^{-4}$ |  |  |
| Ex. 2 | 252 | 2520 | 2.5 | 97 | — | — | — | — |
| Ex. 3 | 325 | 3250 | 2.4**** T: 2.36 V: 0.04 | 98 | 0.85 | 8.34 | 0.957 | 11.1 |
| Ex. 4 | 230 | 2300 | 2.4 | 96 | — | — | — | — |

*** Catalytic activity = g (polymer)/g (catalyst) × hr × C$_2$H$_4$ pressure.
**** T = trans 1,4 type double bonds. V = vinyl type double bonds.

It is clear from the data that the catalytic activity was especially high when the temperature of the reduction was in the range of 50 to 100°C.

EXAMPLES 5 – 8

The procedure of Example 3 was followed except that hydrogen was supplied and the polymerization conditions were modified as shown in Table IV. The results are shown in Table V.

TABLE IV

|  | Time of polymerization (hr) | Polymerization Conditions | | |
|---|---|---|---|---|
|  |  | ethylene pressure (kg/cm$^2$) | hydrogen pressure (kg/cm$^2$) | molar ratio of butadiene/ethylene(liquid) |
| Example 5 | 0.5 | 10 | 11 | 0.16 |
| Example 6 | 0.5 | 10 | 3 | 0.16 |
| Example 7 | 2.0 | 10 | 11 | 3.0 |
| Example 8 | 2.0 | 10 | 3 | 3.0 |

TABLE V

|  | Yield (g) | Catalytic activity *** | Double bond number/1000 C | Molecular weight $\bar{M}$ vt × 10$^{-4}$ |
|---|---|---|---|---|
| Example 5 | 272 | 5440 | 0.55 | 5.6 |
| Example 6 | 290 | 5800 | 0.5 | 15.2 |
| Example 7 | 240 | 1200 | 21.5 | 4.9 |
| Example 8 | 262 | 1310 | 20.3 | 14.9 |

It is clear from the data of Tables IV and V that the molecular weight of the copolymer can be controlled by hydrogen regardless of the ratio of butadiene to ethylene.

EXAMPLES 9 – 12

The procedure of Example 1 was followed except that the kinds of titanium halide, vanadyl trialcoholate, alkylaluminum dichloride and the organoaluminum compound used were changed and the molar ratio of ethylene to butadiene in the liquid phase was varied as shown in Table VI. The results are shown in Table VII.

TABLE VI

|  | Catalyst Component | | | Amount catalyst (mg) | Catalyst component $AlR_nX_{3-n}$ | Molar ratio of ethylene butadiene |
|---|---|---|---|---|---|---|
|  | $TiX_4$ | $VO(OR_3)$ | $AlRCl_2$ | | | |
| Ex. 9 | $TiCl_4$ | $VO(OnC_3H_{17})_3$ | $Al(C_2H_5)Cl_2$ | 10 | $Al(iC_4H_9)_3$ | 0.38 |
| Ex. 10 | $TiBr_4$ | $VO(OnC_4H_9)_3$ | " | 14 | " | 3.2 |
| Ex. 11 | $TiCl_4$ | " | $Al(C_4H_9)Cl_2$ | 10 | $Al(C_2H_5)_3$ | 2.1 |
| Ex. 12 | $TiCl_4$ | " | $Al(C_2H_5)Cl_2$ | 7 | " | 0.78 |

TABLE VII

|  | Yield Copolymer(g) | Catalytic activity | Double bonds number/1000 C | |
|---|---|---|---|---|
|  | | | total F number | trans 1.4 F (%) |
| Example 9 | 292 | 2920 | 2.6 | 97 |
| Example 10 | 212 | 1520 | 20.3 | 97 |
| Example 11 | 214 | 2140 | 16.1 | 98 |
| Example 12 | 163 | 2330 | 10.7 | 96 |

EXAMPLE 13

In accordance with the process of Example 1, ethylene, propylene, butadiene and hydrogen were supplied to the reactor wherein the molar ratio of propylene to ethylene was 0.05, the molar ratio of ethylene to hydrogen was 0.82 in the vapor phase and the molar ratio of ethylene to butadiene was 0.55 in the liquid phase. Ethylene, propylene and butadiene were copolymerized at a total pressure of 15 kg/cm$^2$ for a polymerization time of 120 minutes. As a result, 280 g of a copolymer containing 5.2 pendant methyl groups and 3.8 double bonds per 1,000 carbon atoms and having an average molecular weight of 51,000 was obtained.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing an improved ethylene copolymer, which comprises:
    copolymerizing ethylene and a diolefin selected from the group consisting of 1,3-butadiene and an alkyl substituted 1,3-butadiene, or ethylene, an α-olefin and a diolefin selected from the group consisting of 1,3-butadiene and an alkyl substituted 1,3-butadiene, wherein the mole ratio of said diolefin to said ethylene is 0.1 – 3.0, in the presence of a catalyst system comprising a first solid component prepared by reducing a mixture or a reaction product of (a) a titanium halide and (b) a vanadyl trialcoholate with an alkylaluminum dihalide at a temperature of 50° – 100°C; and
    a second component of an organoaluminum compound.

2. The process according to claim 1, wherein said titanium halide is titanium tetrabromide or titanium tetrachloride.

3. The process according to claim 1 wherein said vanadyl trialcoholate is $VO(O-n-C_4H_9)_3$, or $VO(O-n-C_8H_{17})_3$.

4. The process according to claim 1 wherein said alkylaluminum dihalide is ethylaluminum dichloride or butylaluminum dichloride.

5. The process according to claim 1 wherein said organoaluminum compound as the second component is triethylaluminum, tributylaluminum or trioctylaluminum.

6. The process according to claim 1 wherein said copolymerization is conducted in the presence of hydrogen.

* * * * *